United States Patent
Fanara et al.

(10) Patent No.: US 10,540,299 B2
(45) Date of Patent: Jan. 21, 2020

(54) RESETTING OPERATING STATE HOLDING ELEMENT

(71) Applicant: ARM LIMITED, Cambridge (GB)

(72) Inventors: Carlo Dario Fanara, Antibes (FR); Frederic Jean Denis Arsanto, Le Rouret (FR); Guillaume Schon, Antibes (FR); Jocelyn Francois Orion Jaubert, Antibes (FR)

(73) Assignee: ARM Limited, Cambridge (GB)

( * ) Notice: Subject to any disclaimer, the term of this patent is extended or adjusted under 35 U.S.C. 154(b) by 274 days.

(21) Appl. No.: 15/638,524

(22) Filed: Jun. 30, 2017

(65) Prior Publication Data
US 2019/0004977 A1    Jan. 3, 2019

(51) Int. Cl.
*G06F 9/44* (2018.01)
*G06F 12/14* (2006.01)
*G06F 9/4401* (2018.01)
*G06F 9/24* (2006.01)
*G06F 1/24* (2006.01)
*G06F 9/30* (2018.01)

(52) U.S. Cl.
CPC ............ *G06F 12/1491* (2013.01); *G06F 1/24* (2013.01); *G06F 9/24* (2013.01); *G06F 9/30* (2013.01); *G06F 9/4403* (2013.01)

(58) Field of Classification Search
CPC ..... G06F 1/32; G06F 1/26; G06F 1/28; G06F 9/44
See application file for complete search history.

(56) References Cited

U.S. PATENT DOCUMENTS

| | | | | |
|---|---|---|---|---|
| 2004/0153801 A1* | 8/2004 | Kayukawa | ....... | G01R 31/31719 714/30 |
| 2008/0137800 A1* | 6/2008 | Ohba | .................. | G06F 11/3466 377/19 |
| 2009/0288147 A1* | 11/2009 | Yeung | ..................... | G06F 21/84 726/4 |
| 2013/0145130 A1* | 6/2013 | Brelot | ..................... | G06F 9/384 712/217 |
| 2018/0091149 A1* | 3/2018 | Kuenemund | ........ | H03K 19/007 |

* cited by examiner

*Primary Examiner* — Mohammed H Rehman
*Assistant Examiner* — Keshab R Pandey
(74) *Attorney, Agent, or Firm* — Nixon & Vanderhye P.C.

(57) ABSTRACT

An apparatus has processing circuitry to perform data processing in one of two or more operating states associated with different levels of privilege. At least one operating state holding element holds a state indication indicating a current operating state of the processing circuitry. In response to a transition of a reset signal from a first value to a second value for triggering a reset of the processing circuitry, the at least one operating state holding element resets the state indication to indicate a default operating state other than a most privileged operating state of the two or more operating states.

12 Claims, 6 Drawing Sheets

RESETTING OPERATING STATE HOLDING ELEMENT

BACKGROUND

Technical Field

The present technique relates to the field of data processing.

Technical Background

A data processing system including processing circuitry (e.g. a CPU or GPU) may have a reset mechanism to reset the processing circuitry to a known state, which can be used on power up or to recover from an error, for example. There may be many data holding elements within the system which need to be set to respective reset values during the reset operation. A reset tree may be provided with the reset signal inputs of the various data holding elements connected to respective branches of the reset tree. A reset signal received at a root node of the reset tree may be distributed via the reset tree to the reset signal inputs of the data holding elements. In some cases two or more independent reset trees could be provided in the same integrated circuit.

SUMMARY

At least some examples provide an apparatus comprising: processing circuitry to perform data processing in one of a plurality of operating states associated with different levels of privilege; and at least one operating state holding element to hold a state indication indicating a current operating state of the processing circuitry;

wherein in response to a transition of a reset signal from a first value to a second value for triggering a reset of the processing circuitry, said at least one operating state holding element is configured to reset the state indication to indicate a default operating state other than a most privileged operating state of said plurality of operating states.

At least some examples provide an apparatus comprising: means for performing data processing in one of a plurality of operating states associated with different levels of privilege; and at least one means for holding a state indication indicating a current operating state of the processing circuitry;

wherein in response to a transition of a reset signal from a first value to a second value for triggering a reset of the means for performing data processing, said at least one means for holding is configured to reset the state indication to indicate a default operating state other than a most privileged operating state of said plurality of operating states.

At least some examples provide a data processing method comprising:

performing data processing in one of a plurality of operating states associated with different levels of privilege;

holding a state indication indicating a current operating state of the processing circuitry in at least one operating state holding element; and in response to a transition of a reset signal from a first value to a second value for triggering a reset of the processing circuitry, resetting the state indication held by said at least one operating state holding element to indicate a default operating state other than a most privileged operating state of said plurality of operating states.

Further aspects, features and advantages of the present technique will be apparent from the following description of examples, which is to be read in conjunction with the accompanying drawings.

DESCRIPTION OF EXAMPLES

Some specific examples are described below. It will be appreciated that the invention is not limited to these precise examples.

A reset tree may be provided to distribute a reset signal to various data holding elements (e.g. flip-flops or latches), where a transition of the reset signal from a first value to a second value at a reset signal input of a given data holding element triggers the data holding element to reset its held data value to a corresponding default reset value. The inventors recognised that the reset tree may be vulnerable to a reset tree attack, in which an attacker may try to force the reset signal to switch from the first value to the second value at an intermediate node of the reset tree, even though the reset signal at the root node of the reset tree has not switched value. If the attacker is able to trigger a partial reset of a sub-portion of the reset tree without other portions being reset, this could lead to security breaches.

For example, an operating state holding element for holding a state indication indicating a current operating state of the processing circuitry may be particularly vulnerable to reset tree attacks. An operating state holding element would typically be reset to a value corresponding to a most privileged operating state, because after the reset has been released the processing circuitry may need to carry out various preparatory actions for preparing the processing circuitry ready for processing a software workload, and these preparatory actions may need access to certain registers or memory locations which are only accessible in the most privileged operating state. Therefore, often the instruction set architecture supported by a processing circuitry may require that operating state holding elements must be reset to the most privileged operating state in response to a reset event (when the reset signal transitions from the first value to the second value in order to reset the processing circuitry).

However, the inventors recognised that this causes a problem, because reset tree attacks on a sub-portion of the reset tree may be able to force the operating state holding elements to be reset to the most privileged operating state, effectively gaining additional privilege for a previously executing process which may still be able to continue functioning if other parts of the reset tree have not been reset.

This problem can be addressed by providing at least one operating state holding element which, in response to a transition of a reset signal from a first value to a second value for triggering a reset of the processing circuitry, resets its state indication to indicate a default operating state other than a most privileged operating state of the plurality of operating states supported by the processing circuitry. This is counter-intuitive since this behaviour may contrary to what is required by the instruction set architecture (ISA) supported by the processing data apparatus. However, the inventors recognised that this behaviour can be beneficial as it means that even if an attacker is able to force the reset signal at an intermediate node of the reset tree to transition from the first value to the second value, this would not enable the attacker to switch the processing circuitry into the most privileged operating state, reducing the chance that unprivileged code is able to gain inappropriate access rights associated with the most privileged operating state. This mitigates the consequences of a reset tree attack.

Although the default operating state could be any of the operating states other than a most privileged operating state, in some examples the default operating state may be the least privileged operating state of the plurality of operating states. By resetting the operating state holding element to the least privileged operating state in response to the transition of the reset signal, this ensures that regardless of the current operating state at the time of a reset tree attack, the attacker is not able to gain any additional rights which it did not already have. This avoids unprivileged code being able to execute with greater levels of privilege following a reset tree attack.

The apparatus may have a reset tree for distributing the reset signal received at a root node of the reset tree to reset signal inputs of two or more data holding elements including the at least one operating state holding element, with each data holding element resetting a data value held by the data holding element to a respective reset value in response to the transition of the reset signal from the first value to the second value. The reset values may be different for different data holding elements. For the at least one operating state holding elements the reset value may correspond to the less privileged operating state.

State updating circuitry may be provided to update the at least one operating state holding element to indicate a more privileged operating state than the default operating state, in response to a transition of the reset signal received at the root node of the reset tree from the second value to the first value. Hence, once the reset has been released and the reset signal at the root node of the reset tree switches back to the first value then the state updating circuitry boosts the privilege level of the system by switching to a more privileged operating state. This can be useful since there may be some preparatory actions to be performed following reset which may require the system to be in a more privileged operating state.

Hence, by temporarily resetting to the less privileged operating state, and then switching to the more privileged operating state once the reset signal at the root node of the reset tree switches to the first value, this protects against reset tree attacks on a sub-portion of the reset tree. In the event of a proper reset, then the reset signal at the root node switches to the second value and then back to the first value, and so the operating state holding element is first switched to the less privileged operating state, and then back to a more privileged operating state in order to allow the preparatory actions to be performed. In contrast, during a reset tree attack, the reset signal at the root node of the reset tree does not transition, but the attacker triggers a transition of the root set signal at an intermediate node higher up the tree, and while this triggers a reset of the operating state holding element to the less privileged operating state, as there is no transition of the reset signal at the root node there will then be no subsequent updating of the operating state holding element by the state updating circuitry. Therefore, the system will remain in the less privileged operating state to avoid giving the attacker any additional rights which were not present before. Hence this reduces the severity of the consequences of a reset tree attack, while still enabling the appropriate preparatory actions to be performed following release of the reset that may be required by the instruction set architecture to be performed in a more privileged operating state.

There are a number of ways in which the updating of the operating state holding element (to return to a more privileged operating state following release of the reset signal) can be achieved. In some examples, the processing circuitry may have a finite state machine which controls performance of various preparatory actions following the transition of the reset signal from the second value to the first value. In this case such preparatory actions may include updating the at least one operating state holding element to indicate a more privileged operating state than a default operating state. Hence, the finite state machine may effectively be provided with an additional state which triggers the updating of the operating state holding element. Although it is possible to include such a state at any point of the sequence traversed by the finite state machine, it can be particularly useful to have the state which triggers updating of the operating state holding element to be the first state reached by the finite state machine following reset release, before any subsequent states associated with remaining actions. This is because of the preparatory actions may require the system to be in a more privileged operating state (e.g. for accessing registers or memory addresses restricted for privileged access only) and so it is useful to perform the updating of the operating state before the other preparatory actions.

However, some data holding elements may not be able to be updated with such a finite state machine. For example the circuitry which controls the finite state machine itself would not be able to be updated in this way. In this case an alternative mechanism may be used where a given operating state holding element may be associated with an initialisation signal holding element which holds an initialisation signal which governs the updating of the corresponding data holding element. In response to a transition of the reset signal received at the root node of the reset tree from a first value to a second value, the initialisation signal holding element may switch the initialisation signal to a first value. In response to a transition of the reset signal received at the root node of the reset tree from the second value to the first value, the initialisation signal holding element may switch the initialisation signal to a second value (possibly with at least one processing cycles delay). State updating circuitry may be provided to update the at least one operating state holding element to indicate a more privileged operating state than the default operating state, when the reset signal at the root node of the reset tree has the second value and the initialisation signal has the first value. Setting the initialisation signal in this way means that the state updating circuitry updates the operating state holding element to indicate the more privileged operating state in the first cycle following release of a reset signal from the second value to the first value, and thereafter does not intervene again. It can be useful to couple the initialisation signal holding element to a different reset tree to the at least one operating state holding element. This ensures that if an attacker performs a reset tree attack on the reset tree that includes the operating state holding element, then this attack does not also effect the initialisation signal holding element, to increase robustness against reset tree attacks.

The operating states supported by the processing circuitry can vary in different ways. For example the operating states may include two or more exception levels or privilege levels. The operating states could include a thread mode for executing application software and a handler mode for executing exception handling processing (with the handler mode being considered more privileged than the thread mode). Also, the operating states could include a secure state and a normal state, with data and program code associated with the secure state being isolated from access by program code executing the normal state (and the secure state being considered more privileged than the normal state).

In some systems there may be several overlapping operating states, for example a system may have secure and normal states as discussed above, and within both the secure state and the normal state there may be multiple privilege levels. In this case there may be multiple sets of operating state holding elements, each storing a parameter defining a corresponding state selection (e.g. one set of one or more operating state holding elements defining whether the system is in the secure state or the normal state, and a further set of one or more operating state holding elements which indicate the current privilege level). In this case, each set of operating state holding elements may be reset to a default operating state which represents one of the corresponding set of operating states other than the most privileged operating state.

Figure 1:
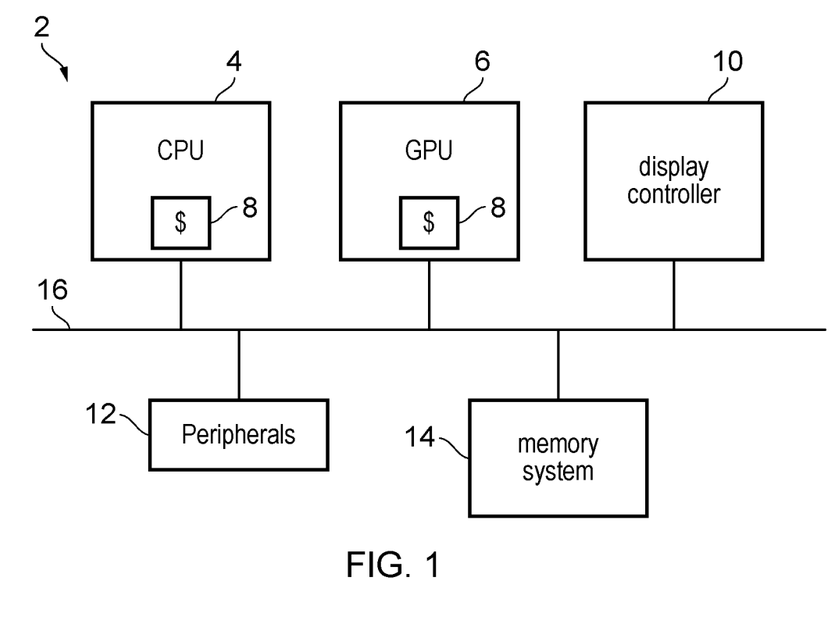
FIG. 1 schematically illustrates an example of a data processing system.

FIG. 1 shows an example of a data processing system 2, which in this example comprises a CPU (central processing unit) 4 and a GPU (graphics processing unit) 6, which are examples of processing circuits. The CPU 4 and GPU 6 include a cache 8. A display controller 10 is provided for controlling display of graphics on a display unit. The system also includes one or more peripherals 12 and a memory system 14 which are coupled to the master devices 4, 6, 10 via a bus 16. It will be appreciated that this is just one example of possible architecture for the system, and the system may include other elements not shown in FIG. 1.

A data processing system such as the one shown in FIG. 1 may include a number of data holding elements (e.g. latches or flip flops) for holding various data values. The data holding elements may include not only storage elements such as registers for holding architectural state of the system, but also internal latches or flip-flops within the processing logic (e.g. an ALU) or control logic (e.g. an instruction decoder), which may need to be reset to a certain known state before any real processing operations are started in order to ensure that those processing operations are performed in a predictable manner.

Figure 2:
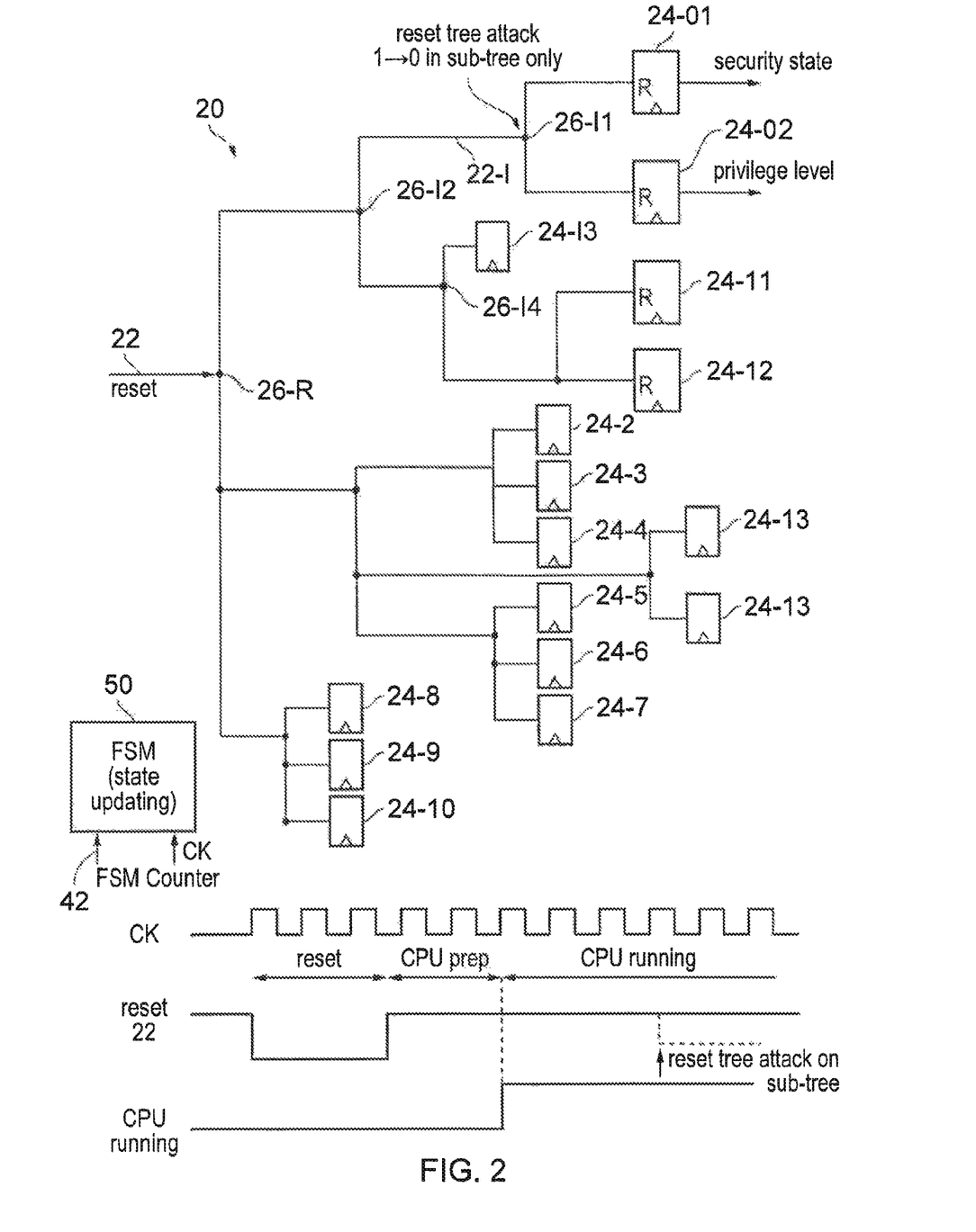
FIG. 2 shows an example of a reset tree for resetting data holding elements to respective reset values.

As shown in FIG. 2, a reset tree 20 may be provided on an integrated circuit to distribute a reset signal 22 to various data holding elements 24-01, 24-02 and 24-2 to 24-14 (referenced below as data holding element(s) 24 when referring in general to any of the data holding elements 24) to be reset. While FIG. 2 shows a single reset tree 20 for ease of explanation, some integrated circuits may include two or more independent reset trees which are provided with separate reset signals from respective reset pins. The reset tree 20 includes a number of nodes 26-R and 26-I1 to 26-I4 (referred to as nodes 26 when referring to any one of the nodes 26) which are connected in a tree structure so that a reset signal 22 gradually fans out to different branches of the tree and eventually reaches the various data holding elements 24 at leaf nodes of the tree. Some data holding elements 24 may be located at lower levels of the tree than others. Each node 26 may correspond to a repeating latch or flip-flop, which boosts the signal level of the reset signal as it is distributed over the integrated circuit, or could simply be a connecting wire or bump. Some of the data holding elements 24 may store an indication of a current operating state of a system, such as a security state or privilege level as shown in the top two data holding elements 24-01, 24-02 shown in FIG. 2.

As shown in the timing diagram at the bottom of FIG. 2, an asynchronous reset mechanism may be provided where the timing of the reset is not triggered relative to a particular phase of the clock signal. In this example the reset event is triggered on a falling edge of the reset signal 22 (dropping from high to low), but other examples could trigger reset by a rising edge of the reset signal. In this example on a falling edge of the reset signal, each data holding element 24 resets its data value to some default reset value. The default reset value could be low or high for different data holding elements (it is not essential for all of the data holding elements to have the same reset value). Subsequently the reset event is released by transitioning the reset signal 22 back to a high signal level, and at this point the CPU 4 or other processing circuit may perform a sequence of preparatory actions for preparing the processing circuitry to perform a software workload.

For example these preparatory actions could include loading a stack pointer into a stack pointer register, fetching an exception handling vector which identifies the address of an exception handling routine to be performed in the event of an exception or interrupt, and so on. Some of these preparatory actions may require the processing circuitry 4 to be operating in a privileged state or secure state and so typically some of the operating state holding elements 24-01, 24-02 shown in FIG. 2 may, on a reset, be reset to a value corresponding to a more privileged state. This may make the system vulnerable to reset tree attacks. During a real reset event, when the reset signal 22 at the root node 26-R of the reset tree 20 transitions low, the entire reset tree will experience the falling edge of the reset signal and so all the data holding elements connected to the tree will be reset, and so the processing circuitry may enter a predictable known state. However, if an attacker is able to tamper with the integrated circuit and force the reset signal at a given intermediate node 26-I1 to 26-I4 of the reset tree to drop low, then this may cause some of the data holding elements 24 within a sub branch of the reset tree to reset to their default reset values, while other parts of the reset tree are not reset and may continue with the previous values. In some cases the other parts of the tree may continue function as normal and may continue to execute software instructions. If the part of the tree that has been attacked includes operating state holding elements 24-01, 24-02, then this may allow the attacker to effectively switch the system into a secure or privileged state even if the software that was running at the time should be unprivileged or non-secure. This can lead to the constraints imposed by the software running in an unprivileged or less secure state being circumvented. In summary, by attacking the reset tree, the attacker may be able to reset only a sub-portion of the integrated circuit design, thus breaking the whole design's integrity state while letting the processing circuitry operate in a state in which it can still advance. At this point there is a problem since the whole system may not know that it is in a faulty and vulnerable state.

Hence, the system can be vulnerable to reset tree attacks if operating state holding elements 24-01, 24-02 are reset to values corresponding to a most privileged operating state as is required by many instruction set architectures.

Counter intuitively, the present technique instead resets such operating state holding elements 24-01, 24-02 to a less privileged operating state, in particular the least privileged operating state, so that even if an attacker successfully attacks the reset tree than this cannot lead to a switch to the most privileged operating state and so reduces the writes available to the software executed following the reset tree attack. Although on real reset events it may be expected that the most privileged operating state is required in order to carry out preparatory actions for preparing for subsequent processing, the inventors recognise that boosting the privilege state can be done as part of such preparatory actions, e.g. during the CPU preparation phase shown in FIG. 2.

Figure 3:
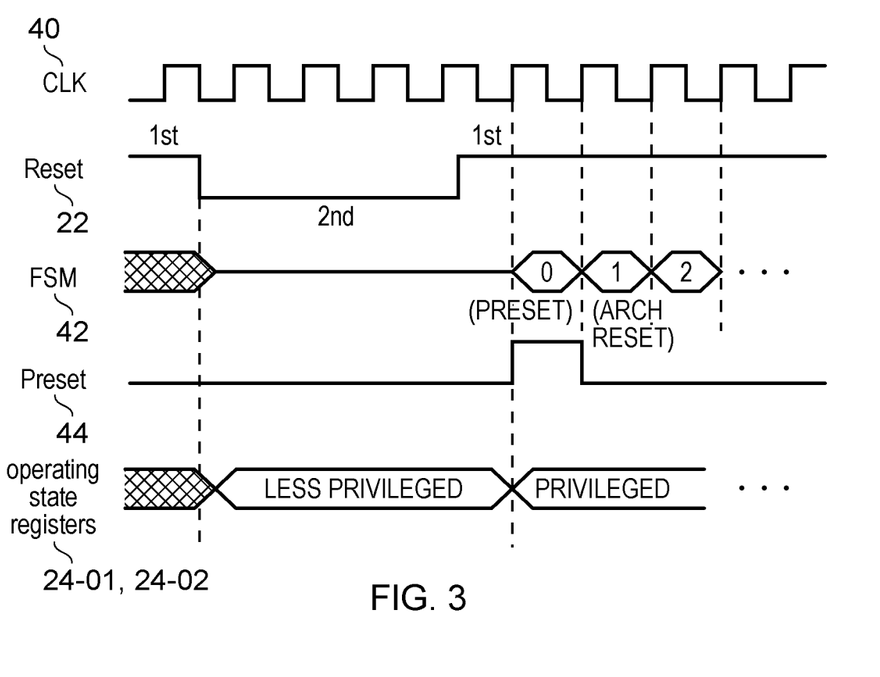
FIG. 3 is a timing diagram showing an example of resetting an operating state holding element to indicate a default operating state other than a most privileged operating state.

FIG. 3 shows a timing diagram illustrating such a reset operation. FIG. 3 shows a clock signal 40, the reset signal 22, a finite state machine counter 42 for counting through a set of states of a finite state machine (FSM) used for triggering the preparatory actions during the CPU preparation phase, a preset signal 44 which is triggered to generate a pulse in the cycle following the reset release cycle in which the reset signal is transitioned from the second value to the first value, and one or more operating state registers 24-01, 24-02 which correspond to at least one of the operating state holding elements discussed above. In this example the first value of the reset signal corresponds to logical 1 in the second value corresponds to logical 0, so that reset is triggered on a falling edge of the reset signal and reset release triggered on a rising edge. However, it will be appreciated that other implementations may trigger a reset by a rising edge of the reset signal and release the reset using a falling edge (with the first value corresponding to logical 0 and the second value to logical 1).

As shown in FIG. 3, in response to a transition of the reset signal from the first value to the second value, the operating state registers 24-01, 24-02 are reset to a less privileged operating state. This is done even though the instruction set architecture requires the system to be in privileged operating state in order to carry out preparatory actions.

In response to a transition of the reset signal 22 of the reset signal 22 at the root node 26-R of the reset tree 20 from the second value to the first value, finite state machine control circuitry 50 shown in FIG. 2 is triggered to start cycling through states of a FSM in order to perform a number of preparatory actions, such as resetting the architectural values of registers to given values, fetching a stack pointer of a main stack in memory, loading an exception handling vector, etc. As shown in FIG. 3, the first action of the finite state machine performed in FSM cycle 0 is the preset action in which the operating state registers 24-01, 24-02 are updated by the state updating circuitry 50 to indicate a more privileged state than the default state to which they were reset. For example the more privileged state could be a secure state in a system having secure and normal states, the upper privilege/exception level (with greatest rights available to the processing circuitry) in a system with multiple levels of privilege/exception level, or a handler mode in a system having thread and handler modes. In subsequent cycles of the FSM, other preparatory operations are performed which require the system to be in the more privileged state, e.g. operations which require access to a stack pointer register or other control register, or to exception handling vectors, for example. The system continues through each of the states of the FSM, and on completion of the preparatory actions, the system can commence processing of a software workload. Subsequently, the operating state represented by the operating state registers 24-01, 24-02 depends on the outcome of the software instructions or on external events such as interrupts.

Figure 4:
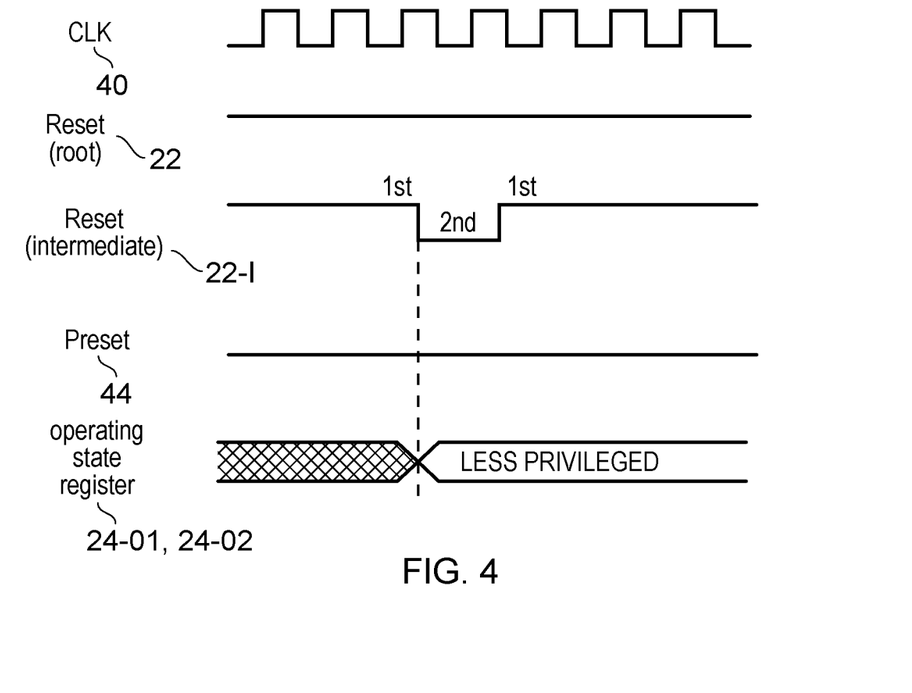
FIG. 4 is a timing diagram showing an example of a reset tree attack.

FIG. 4 is a timing diagram showing the signals during a reset tree attack. Again FIG. 4 shows the clock signal 40, the set signal 22 at the root node 26-R of the reset tree, the preset signal 44 and the operating state registers 24-01, 24-02. FIG. 4 also shows the reset signal 22-I at an intermediate node 26-I1 of the reset tree 20. The attacker tampers with the circuit and forces the reset signal 22-I at the intermediate nodes to switch from the first value to the second value to simulate a reset event. This causes the operating state registers 24-01, 24-02 within the corresponding portion of the reset tree to reset to the less privileged state in the same way as FIG. 3. However, as the reset signal 22 at the root node 26-R of the reset tree has remained unchanged, the preset signal 44 does not pulse and there is no triggering of the finite state machine 42 for carrying out the preparatory actions. Therefore, the operating state registers remain in a less privileged state and so the attacker does not gain inappropriate write to access privileged data or registers from an unprivileged software.

The functionality shown in FIGS. 3 and 4 can be represented logically as follows:

```
At posedge CLK or negedge Reset:
    if (~reset)
        regs_q <= less_privileged
    elseif (preset)
        regs_q <= privileged
    else
        regs_q <= regs_next
```

(where posedge CLK represents a rising edge of the clock signal, negedge Reset represents a falling edge of the reset signal, ~reset represents the inverse of the reset signal 22, preset represents the present signal 44, regs_q represents the state of the operating state registers 24-01, 24-02, and regs_next represents the next state to be written to the operating state registers 24-01, 24-02 during normal processing operations once the CPU is operational).

In summary, the physical asynchronous reset input for the operating state holding flops 24-01, 24-02 is connected to a value that represents the less privileged operating state, i.e. contrary to what may be required by the ISA. A logical reset state is added in the processing element 4, 6, 10 (or an existing reset state like a finite state machine is reused), which takes care of setting the protected flops 24-01, 24-02 to the architectural privileged value before doing any real processing operations and before the first fetches/loads on buses. With such a counter-measure, if a real reset of the processor is performed, the whole CPU is reset and the protected flops physically reset to non-privileged values. When reset is deasserted, the CPU comes out of its reset state, sets the protected flops to the architecturally-correct privileged values and continues with its logical reset steps (e.g., fetch of MSP pointer, fetch of reset vector, etc.). If a fault injection (reset tree attack) is performed, the operating state holding flops 24-01, 24-02 reset to their less privileged value, so the SW might continue to run, but the attempt to gain any higher right is neutralized.

Figure 5:
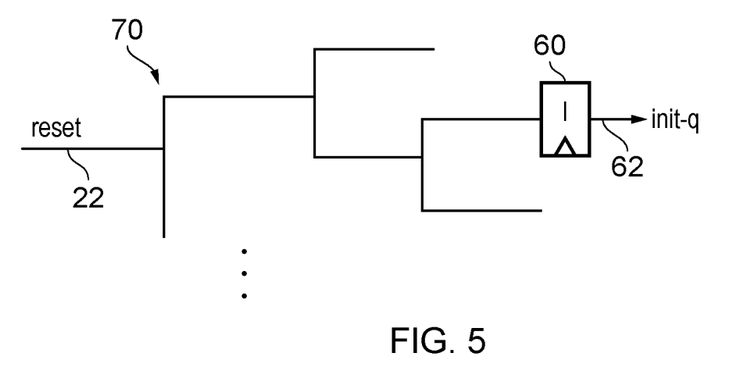
FIG. 5 shows an alternative technique for resetting the operating state holding element.

The use of a finite state machine as discussed above can be used for many data holding elements within the system, but may not be appropriate for all data holding elements. For example there may be some flip flops in an always-on domain which remains powered during the reset handling which cannot be reset by the CPU during a CPU reset state. For example, these may include flip-flops which are within the state updating circuitry 50 for controlling the finite state machine itself. In this case, as shown in FIG. 5, an operating state holding element 24-01, 24-02 may be associated with a corresponding initialisation signal holding element 60 which provides an initialisation signal 62 which represents whether a real power-on reset is being performed. This initialisation signal element 60 may generate the initialisation signal 62 to provide a pulse when a real power on reset is deasserted. For example the initialisation signal 62 may be generated according to the following logic functions:

```
At posedge CLK or negedge Reset:
    if (~reset)
        init_q <= 0
    elseif (init_q == 0)
        init_q <= 1.
At posedge CLK or negedge Reset:
    if (~reset)
        regs_q <= less_privileged
    elseif (~init_q)
        regs_q <= privileged
    else
        regs_q <= regs_next.
``` where init_q represents the initialisation signal 62 and the other parameters are as defined above for the previous example.

Figure 6:
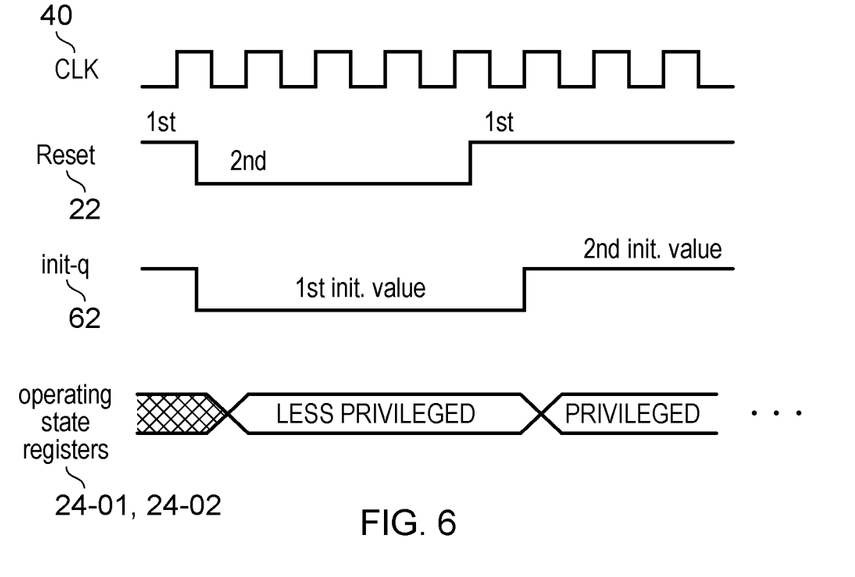
FIG. 6 is a timing diagram illustrating the technique of FIG. 5.

FIG. 6 is a timing diagram showing the clock signal 40, reset signal 22, initialisation signal 62, and operating state registers 24-01, 24-02 for the example of FIG. 5. When the reset signal switches from the first value to the second value to trigger a reset, then this also triggers a corresponding transition of the initialisation signal to switch to a first initialisation value. The release transition of the reset signal 22 at the root node 26-R of the reset tree from the second value back to the first value allows the subsequent positive edge of clock signal 40 to synchronously trigger the initialisation signal holding element 60 to switch the initialisation signal 62 to a second initialisation value. The positive edge of the clock signal 40 together with the reset signal 22 at its first value and the initialisation signal 62 at its first value generate the triggering condition for the operating state registers 24-01, 24-02 to switch to a more privileged operating state. This avoids the need to use the finite state machine in order to trigger the update.

As shown in FIG. 5, the initialisation signal holding element 60 may be provided on a separate reset tree 70 to the reset tree 20 which comprises the operating state holding element 24-01, 24-02. This ensures that even if the attacker performs a reset tree attack on one reset tree then this does not affect the other reset tree, reducing the risk of having both the operating state flip flop 24-01, 24-02 and the initialisation flip flop 60 reset during a reset tree attack.

Figure 7:
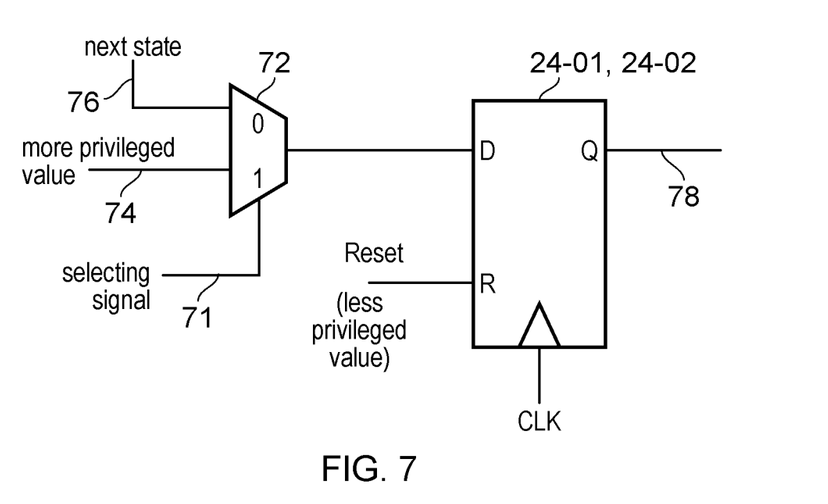
FIG. 7 shows an example of the operating state holding element with circuitry for controlling the resetting of the operating state and updating of the operating state in response to reset release.

FIG. 7 illustrates how the operating state holding flip flop 24-01, 24-02 can be controlled to be reset to the less privileged state and then boosted to a more privileged state following release of reset. The reset signal input R of the flip flop is connected to a value corresponding to the less privileged state. The data input D is connected to the output of a multiplexer 72 which selects between a value 74 corresponding to the more privileged state and a signal path 76 which provides the next state to which the flip flop is to be set during the CPU running phase. The multiplexer 72 selects between values 74 or 76 depending on a selecting signal 71, which can be either the preset signal 44 in the example of FIG. 3 or the negative of the initialisation signal 62 (i.e. ~init_q) in the example of FIG. 6. When the selecting signal 71 is 1 then the more privileged state indicating value 74 is supplied to the data input D of the flip flop 24-01, 24-02, and this causes the output 78 to be set to the more privileged operating state on the positive edge of clock signal 40, while during subsequent CPU running the multiplexer 72 will simply select the next state which is generated depending on events occurring during the execution of the software workload. Meanwhile, a reset event (whether a real reset or a reset tree attack (fault injection)) forces the operating state back to the less privileged value, so that even if there is a reset tree attack this does not lead to additional privileges being granted.

Figure 8:
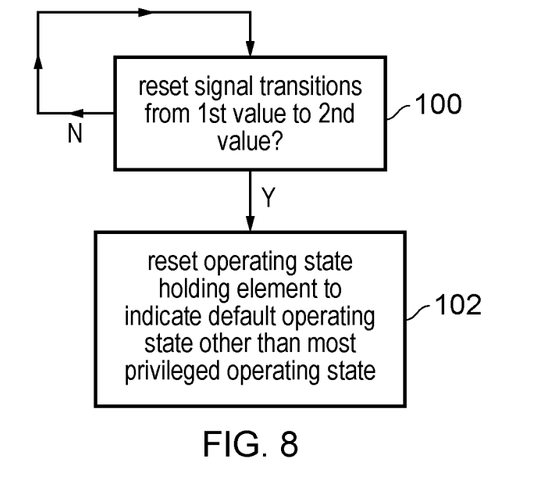
FIG. 8 shows a method of resetting the operating state holding element.
Figure 9:
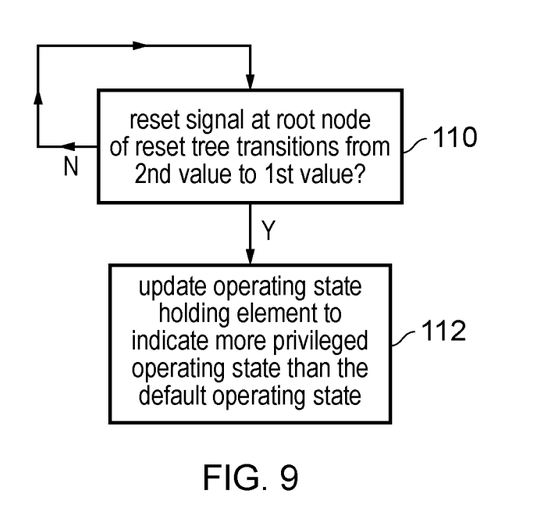
FIG. 9 shows a method of updating the operating state holding element to indicate a more privileged operating state when the reset signal is released.

FIGS. 8 and 9 are flow diagrams showing methods of defending against reset tree attacks. FIG. 8 shows the functioning of the operating state holding element while FIG. 9 shows the functioning of the state updating circuitry 50. As shown in FIG. 8, at step 100 the operating state holding element detects whether the reset signal connected to its reset signal output R has transitioned from the first value to the second value. If so then at step 102 the operating state holding element is reset so that its output indicates the default operating state which is a state other than the most privileged operating state. For example, the default operating state may be the least privileged operating state. For example, the default operating state could be a non-secure state, a lowest privileged level or lowest exception level, or a thread mode.

As shown in FIG. 9, at step 110 the state updating circuitry detects whether the reset signal at the root node 26-R of the reset tree has transitioned from the second value to the first value, and if so, then at step 112 the state updating circuitry 50 controls the operating state holding element to be updated to indicate a more privileged operating state than the default operating state. For example, the update could change the privilege state to the most privileged operating state. For example, the more privileged operating state could be a secure mode, a highest exception level of privilege level or a handler mode.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in one of a plurality of operating states associated with different levels of privilege; and
at least one operating state storage circuit to hold a state indication indicating a current operating state of the processing circuitry;
a reset tree to distribute a reset signal received at a root node of the reset tree to reset signal inputs of a plurality of data storage circuits including said at least one operating state storage circuit, each data storage circuit to reset a data value held by the data storage circuit to a respective reset value in response to a transition of a reset signal from a first value to a second value for triggering a reset of the processing circuitry;
wherein in response to the transition of the reset signal at an intermediate node of the reset tree from the first value to the second value, said at least one operating state storage circuit is configured to reset the state indication to indicate a default operating state other than a most privileged operating state of said plurality of operating states; and
state updating circuitry to update said at least one operating state storage circuit to indicate a more privileged operating state than the default operating state, in response to a transition of the reset signal received at the root node of the reset tree from the second value to the first value.

2. The apparatus according to claim 1, wherein said default operating state comprises a least privileged operating state of said plurality of operating states.

3. The apparatus according to claim 1, wherein following a transition of the reset signal from the second value to the first value, the processing circuitry is configured to perform a plurality of preparatory actions for preparing the processing circuitry for processing of a software workload, said preparatory actions comprising updating said at least one operating state storage circuit to indicate a more privileged operating state than the default operating state.

4. The apparatus according to claim 3, wherein the processing circuitry is configured to perform said plurality of preparatory actions under control of a finite state machine.

5. The apparatus according to claim 3, wherein said processing circuitry is configured to update said at least one operating state storage circuit before performing remaining actions of said plurality of preparatory actions.

6. The apparatus according to claim 1, comprising:
an initialization signal storage circuit to hold an initialization signal, wherein in response to a transition of the reset signal received at the root node of the reset tree from the first value to the second value, the initialization signal storage circuit is configured to switch the initialization signal to a first initialization value, and in response to a transition of the reset signal received at the root node of the reset tree from the second value to the first value, the initialization signal storage circuit is configured to switch the initialization signal to a second initialization value; and
state updating circuitry to update said at least one operating state storage circuit to indicate a more privileged operating state than the default operating state, when the reset signal received at the root node of the reset tree has the second value and the initialization signal has the first initialization value.

7. The apparatus according to claim 6, wherein the signal storage circuit is coupled to a different reset tree to the at least one operating state storage circuit.

8. The apparatus according to claim 1, wherein the plurality of operating states comprise a plurality of exception levels or privilege levels.

9. The apparatus according to claim 1, wherein the plurality of operating states comprise a thread mode for executing application software and a handler mode for executing exception handling processing.

10. The apparatus according to claim 1, wherein the plurality of operating states comprise a secure state and a normal state, wherein data and program code associated with the secure state are isolated from access by program code executing in the normal state.

11. An apparatus comprising:
means for performing data processing in one of a plurality of operating states associated with different levels of privilege; and
at least one means for holding a state indication indicating a current operating state of the means for performing data processing; and
means for distributing a reset signal received at a root node to reset signal inputs of a plurality of means for holding data including said at least one means for holding the state indication, each means for holding data to reset a data value held by the means for holding data to a respective reset value in response to a transition of the reset signal from a first value to a second value for triggering a reset of the means for performing data processing;
wherein in response to the transition of the reset signal at an intermediate node of the means for distributing from the first value to the second value, said at least one means for holding is configured to reset the state indication to indicate a default operating state other than a most privileged operating state of said plurality of operating states; and
means for updating said at least one means for holding the state indication to indicate a more privileged operating state than the default operating state, in response to a transition of the reset signal received at the root node from the second value to the first value.

12. A data processing method comprising:
performing data processing using processing circuitry in one of a plurality of operating states associated with different levels of privilege;
holding a state indication indicating a current operating state of the processing circuitry in at least one operating state storage circuit; and
distributing a reset signal received at a root node of a reset tree to reset signal inputs of a plurality of data storage circuits including said at least one operating state storage circuit, each data storage circuit resetting a data value held by the data storage circuit to a respective reset value in response to a transition of the reset signal from a first value to a second value for triggering a reset of the processing circuitry;
in response to the transition of the reset signal at an intermediate node of the reset tree from the first value to the second value, resetting the state indication held by said at least one operating state storage circuit to indicate a default operating state other than a most privileged operating state of said plurality of operating states; and
in response to a transition of the reset signal received at the root node of the reset tree from the second value to the first value, updating said at least one operating state storage circuit to indicate a more privileged operating state than the default operating state.

\* \* \* \* \*